United States Patent [19]
Johnson

[11] Patent Number: 5,394,704
[45] Date of Patent: Mar. 7, 1995

[54] ALTERNATE METHOD FOR ACHIEVING TEMPERATURE CONTROL IN THE −160 TO +90 DEGREES CELCIUS RANGE

[75] Inventor: Kenneth R. Johnson, Los Angeles, Calif.

[73] Assignee: The United States of America as represented by the Administrator of the National Aeronautics and Space Administration, Washington, D.C.

[21] Appl. No.: 152,631

[22] Filed: Nov. 4, 1993

[51] Int. Cl.$^6$ .......................... F25B 19/00; F17C 9/02
[52] U.S. Cl. ..................... 62/51.1; 62/50.2; 62/50.4; 62/122; 62/159
[58] Field of Search ............. 62/49.1, 50.2, 50.4, 62/51.1, 78, 122, 159; 236/13

[56] References Cited

U.S. PATENT DOCUMENTS

| | | | |
|---|---|---|---|
| 1,978,382 | 10/1934 | Jones | 62/121 |
| 2,247,850 | 7/1941 | Rayburn | 62/121 |
| 3,037,360 | 6/1962 | Starnes et al. | 62/122 X |
| 3,091,096 | 5/1963 | Rendos et al. | 62/50.2 |
| 3,174,294 | 3/1965 | Lawrence | 62/50.4 |
| 3,273,348 | 9/1966 | DeHart, Jr. | 62/49.1 |
| 3,304,739 | 2/1967 | Erath | 62/50.4 X |
| 3,550,390 | 12/1970 | Puzniak | 62/122 X |
| 3,672,182 | 6/1972 | Stowasser et al. | 62/98 |
| 4,116,017 | 9/1978 | Oberpriller | 62/51.1 X |
| 4,280,499 | 7/1981 | Squazzi | 62/50.2 X |
| 4,295,339 | 10/1981 | Kuraoka et al. | 62/51.1 X |
| 4,346,754 | 8/1982 | Imig et al. | 62/51.1 X |
| 4,481,780 | 11/1984 | Delano | 62/52 |
| 5,085,056 | 2/1992 | Page | 62/64 |
| 5,107,906 | 4/1992 | Swenson et al. | 62/50.2 X |
| 5,174,122 | 12/1992 | Levine | 62/50.2 |
| 5,207,068 | 5/1993 | Bridden | 62/51.1 |
| 5,255,525 | 10/1993 | Wieland et al. | 62/50.2 X |

FOREIGN PATENT DOCUMENTS 286898  3/1953  Switzerland .................... 62/122

*Primary Examiner*—Christopher Kilner
*Attorney, Agent, or Firm*—Thomas H. Jones; John H. Kusmiss; Guy M. Miller

[57] ABSTRACT

A single-pass method for accurate and precise temperature control in the −160° to +90° C. range, and which exhibited minimal set-point overshoot during temperature transitions. Control to ±2° C. with transitions between set-points of 7° C. per minute were achieved. The method uses commercially available temperature controllers and a gaseous nitrogen/liquid nitrogen mixer to dampen the amplitude of cold temperature spikes caused by liquid nitrogen pulsing.

15 Claims, 11 Drawing Sheets

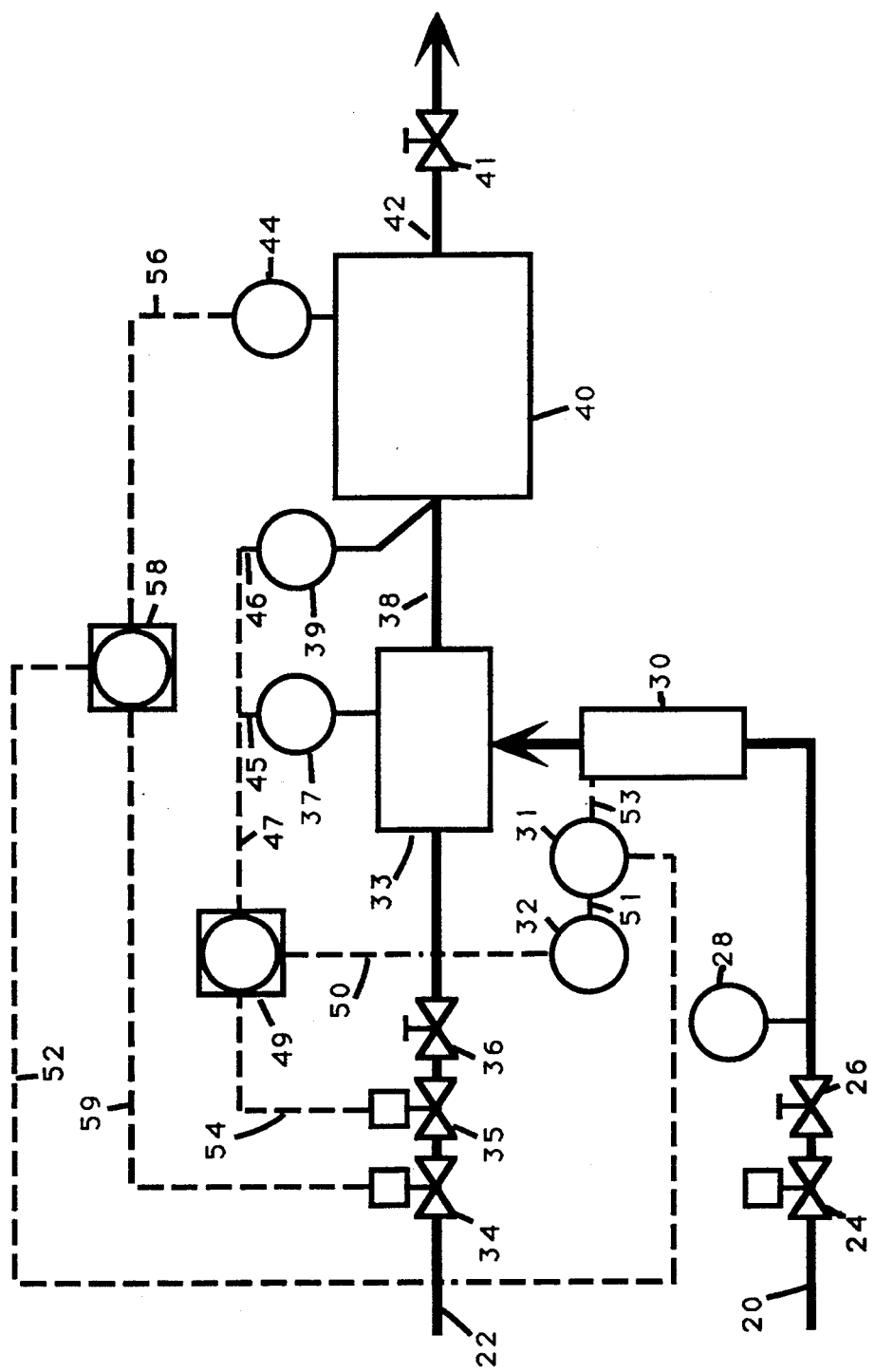
FIG. 1A. Simplified Type-1 Control System

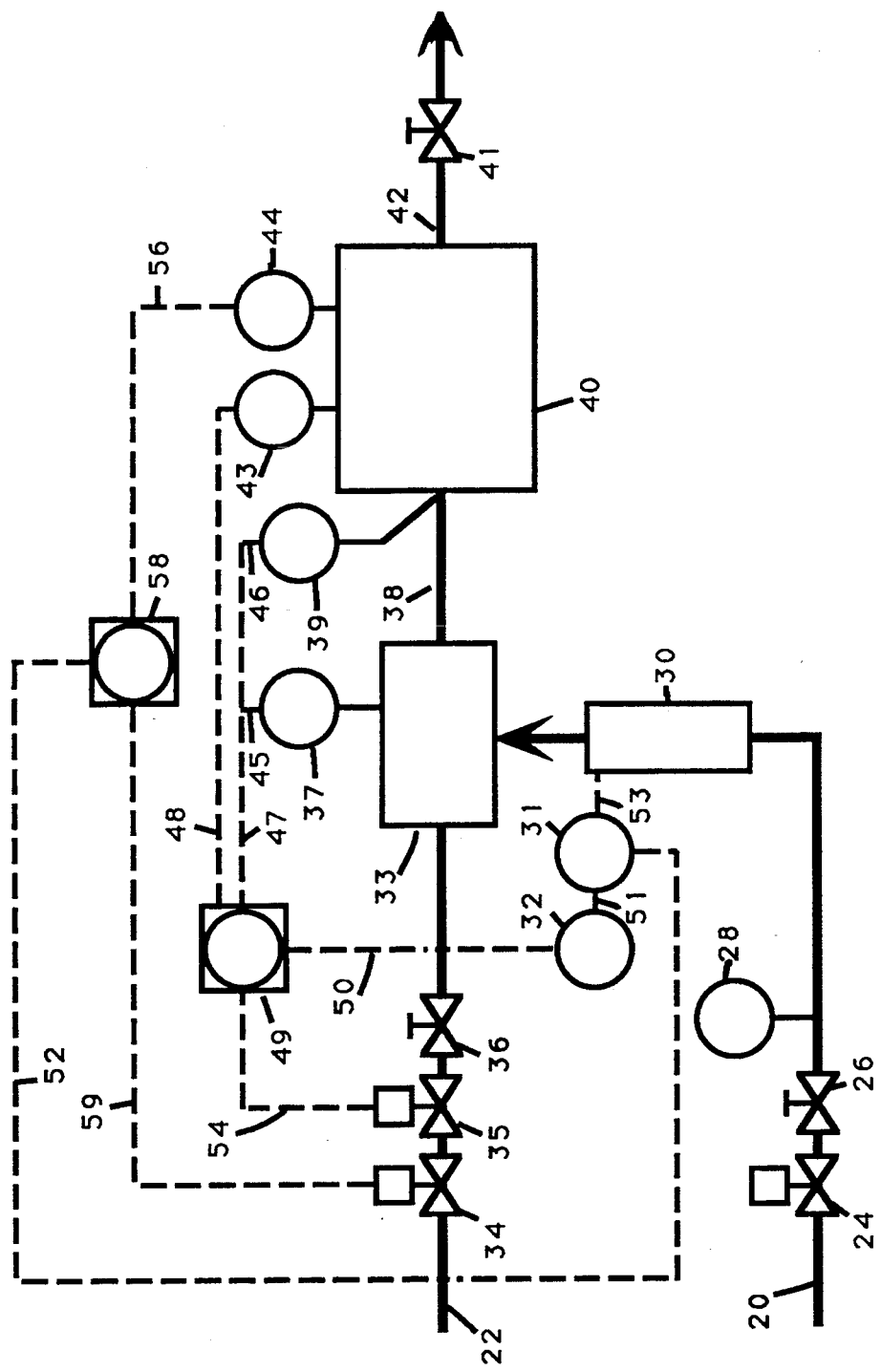
FIG. 1B. Simplified Type-2 Control System

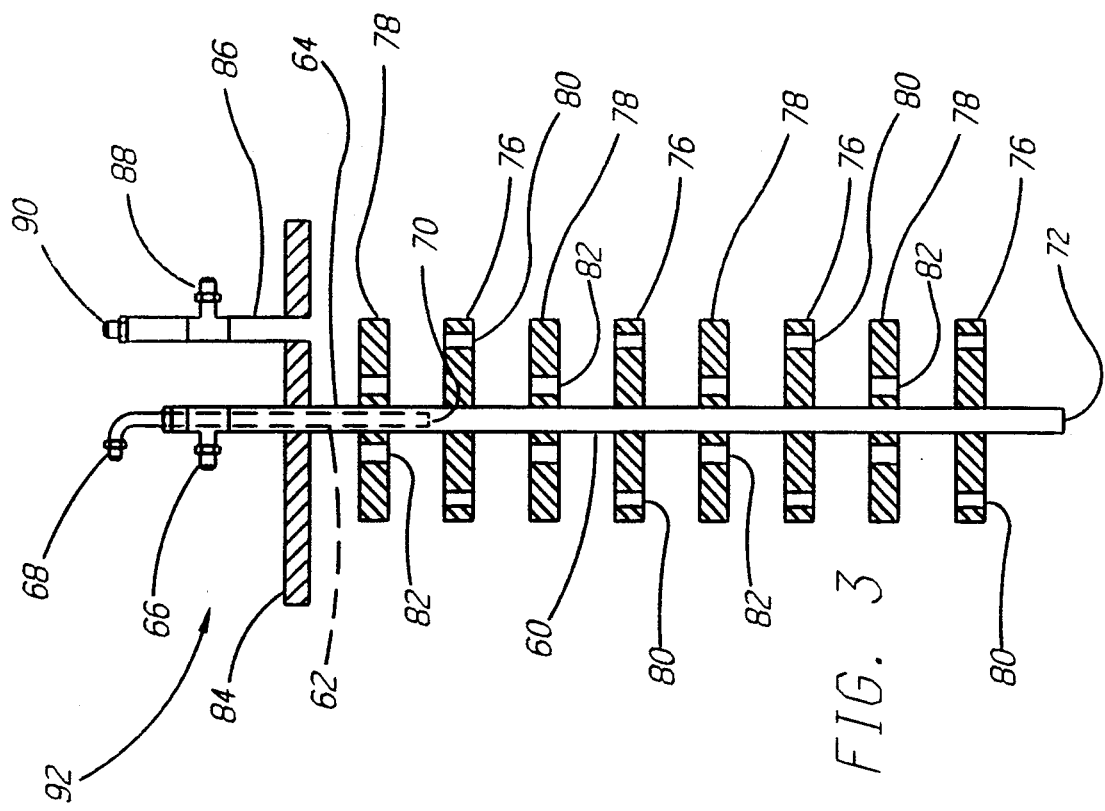
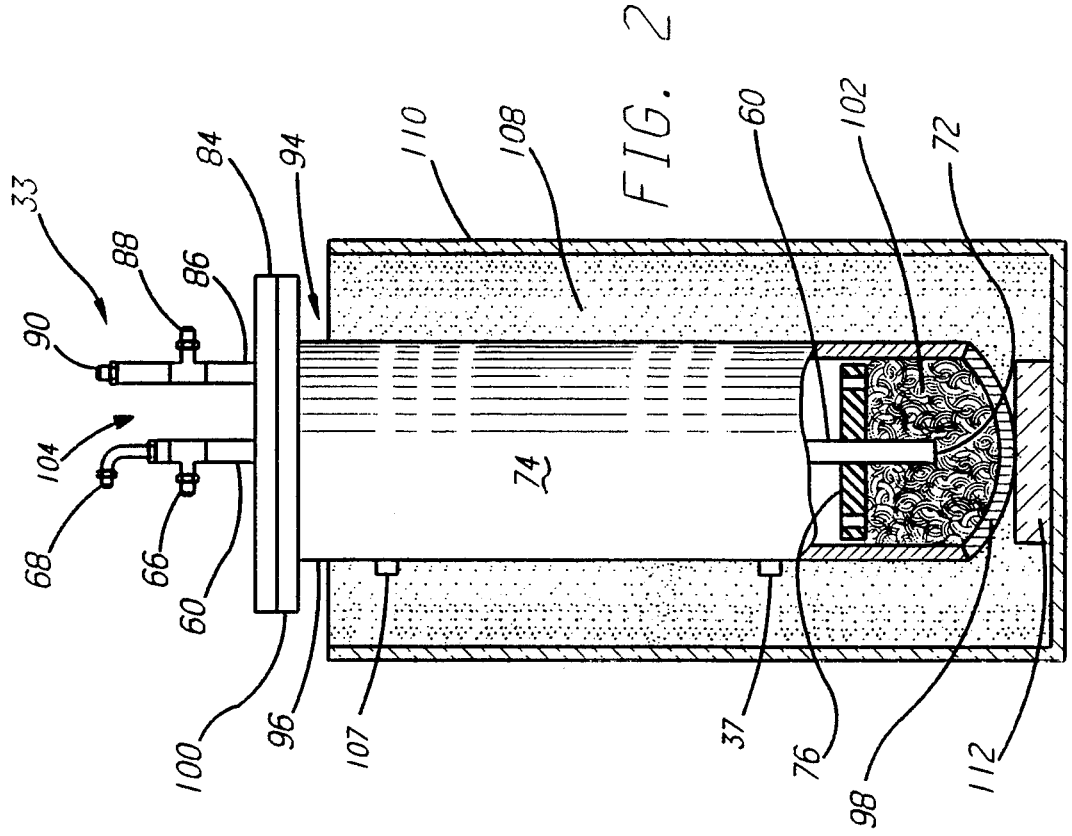

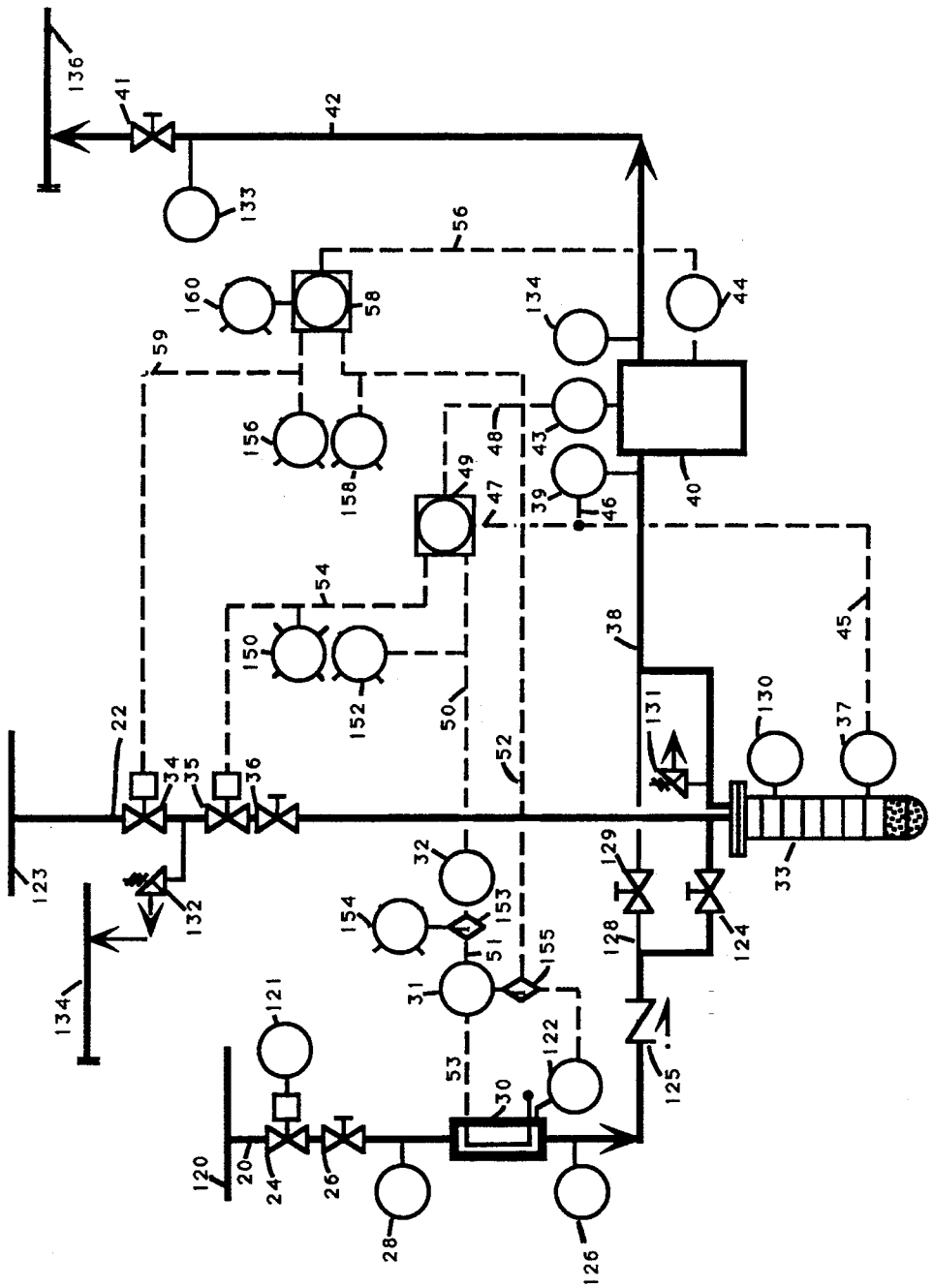
FIG. 4. Control System Flow Schematic and Instrumentation Diagram

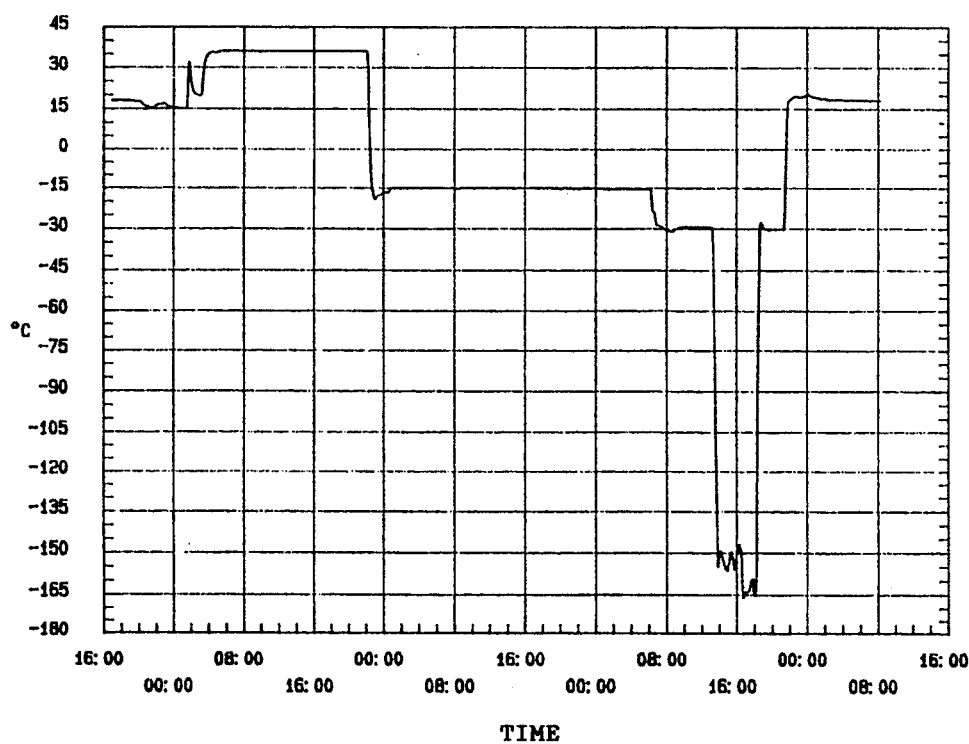
FIG. 11. WF/PC II Shroud Temperature Control Profile of One Circuit
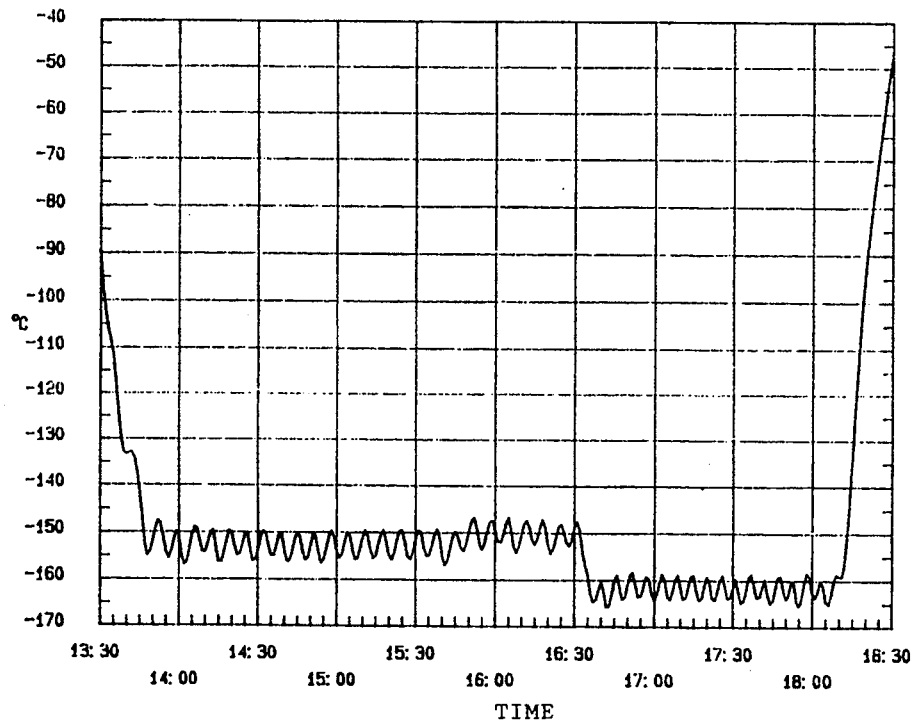
FIG. 12. WF/PC II Shroud Temperature Control Precision Profile of One Circuit

ALTERNATE METHOD FOR ACHIEVING TEMPERATURE CONTROL IN THE −160 TO +90 DEGREES CELCIUS RANGE

ORIGIN OF INVENTION

The invention described herein was made in the performance of work under a NASA contract, and is subject to the provisions of public Law 96-517 (35 USC 202) in which the Contractor has elected not to retain title.

BACKGROUND OF THE INVENTION

Thermal vacuum testing often requires temperature control of chamber shrouds and heat exchangers within the −160° to +90° C. range. There are several conventional methods which are normally employed to achieve control over this range. In a first method, using single-pass flow, temperature control is achieved by alternately pulsing hot gaseous nitrogen and cold liquid nitrogen into the feed line to the shroud to obtain setpoint temperature. In a second method, using closed-loop circulation, temperature control is accomplished by either electrically heating or liquid nitrogen cooling the circulated gaseous nitrogen to the shroud to obtain set-point temperature. A third method, which uses a mass flow ratio controller and modulating control valves on gaseous nitrogen and liquid nitrogen lines, provides excellent control, however, equipment for this method is expensive and cost-prohibitive for all but long term continuous processes.

Unfortunately, single-pass methods in the past provided marginal control and often resulted in unexpected overcooling of the test article when even a short pulse of liquid nitrogen is delivered. Where precise temperature control is needed, i.e. about ±2° C., single-pass systems typically have not provided the precision required, primarily because of overcooling temperature excursions.

The closed loop circulation method provides excellent control but, unfortunately, requires an expensive blower capable of operating at elevated pressures and cryogenic temperatures. Where several individual; circuits are to be controlled at different temperatures, the use of expensive cryogenic blowers for each circuit is also cost-prohibitive, especially for short duration or one-of-a-kind tests.

Accordingly, there is a need for an inexpensive single-pass system having high precision temperature control.

SUMMARY OF THE INVENTION

Preparation for the thermal vacuum testing of the Wide Field/Planetary Camera II, hereinafter referred to as "WF/PC II" required review of existing temperature control methods to determine which method could best provide the special test needs for WF/PC II. Since the camera will be inserted into the instrument bay of the Hubble Space Telescope, hereinafter referred to as "HST", body and, when in place, its curved surface will face cold space while all of its other surfaces will be enclosed within the warmer HST body, there was a need for a test fixture that would simulate multiple temperature environments.

Because the WF/PC II thermal vacuum test is of relatively short duration, closed loop temperature control of each circuit was deemed cost-prohibitive. Furthermore, since the single-pass temperature control method that had been used to test WF/PC I had not provided the desired precision, a new temperature control technique was required.

In response to these needs, a single-pass method was developed, using the principles of this invention, that demonstrated precise temperature control in the −160° to +90° C. range, and which exhibited minimal set-point overshoot during temperature transitions. The method uses commercially available temperature controllers and a gaseous nitrogen/liquid nitrogen mixer to dampen the amplitude of cold temperature spikes caused by liquid nitrogen pulsing.

Furthermore, using the principles of this invention, a test fixture consisting of ten individually controllable shroud circuits was built which simulated these multiple temperature environments.

There is no apparent reason why the system of this invention cannot be used effectively for controlling shroud or other heat exchanger temperatures below −160° C. and above +90° C.

Accordingly, there is provided by the principles of this invention a single-pass flow-through system for producing precision temperature control in the −160° to +90° C. temperature range of a heat exchanger means which is used to simulate the temperature environment of a test article. Non-limiting examples of heat exchanger means are shrouds and other heat exchangers. The system comprises a first source for providing gaseous nitrogen at ambient temperature and constant pressure and flow rate, and a second source for providing liquid nitrogen at constant pressure. The system further comprises a first line for receiving gaseous nitrogen from the first source which comprises an open-and-close solenoid valve, a first hand-controlled throttle valve for manually adjusting the flow of gaseous nitrogen in the first line, a flow meter for measuring the gaseous nitrogen flow rate, and an in-line electric heater for heating the gaseous nitrogen. The system includes a second line for receiving liquid nitrogen from the second source which comprises a fail-safe control open-and-close solenoid valve, a master control open-and-close solenoid valve, and a second hand-controlled throttle valve for manually adjusting the flow of liquid nitrogen in the second line. The system further includes a mixer for receiving gaseous nitrogen from the first line and liquid nitrogen from the second line, and for mixing the gaseous nitrogen and liquid nitrogen and forming a tempered gaseous nitrogen stream; heat exchanger means for receiving the tempered gaseous nitrogen stream from the mixer; and a third line for receiving the gas from the heat exchanger means comprising a back-pressure control valve for adjusting the pressure in the heat exchanger means, and a vent for venting the gas from the adjustable back-pressure control valve and from the system. The system also has controller means for sensing temperature of at least two predetermined points in the system, and for using the sensed temperature for controlling the master control open-and-close solenoid valve in the second line, and for controlling the power to the heater in the first line, such that the system is operable for producing accurate and precise temperature control in the about −160° to about +90° C. temperature range of the tempered gas stream supplied to the heat exchanger means.

In one embodiment the difference between the pressure of the liquid nitrogen provided by the high pressure second source, and the pressure of the gaseous nitrogen provided by the low pressure first source, is no greater than about 10 psi.

In another embodiment, the mixer comprises means for directly mixing a constant flow gaseous nitrogen stream received from the first line with pulsed slugs of liquid nitrogen received from the second line, thereby forming a mixed stream; means for inducing high turbulence in the mixed stream to maximize the contact and mixing of gas and unvaporized liquid; means for directing the mixed stream in contact with a heat sink mass through a tortuous flow path through the heat sink mass to maximize the heat transfer between the mixed gas stream and the heat sink mass; means for applying the heat sink mass to act as a thermal shock absorber to dampen temperature fluctuations in the mixed stream and to deliver a tempered gas stream free of high amplitude temperature spikes to the mixer exit.

In one embodiment the mass of the mixer is operable for enabling a gaseous nitrogen temperature transition rate of from about 4° to about 10° C. per minute between set-point temperature changes. In another embodiment the mass of the mixer is operable for producing a gaseous nitrogen temperature of within about ±2° C. of the set-point temperature, and in a further embodiment within about ±1° C. of the set-point temperature.

In one embodiment the adjustable back-pressure control valve is a manually adjustable back-pressure control valve. In another embodiment the adjustable back-pressure control valve is an automatically adjustable back-pressure control valve.

In one embodiment, the master controller means has a process temperature set-point, whereby the process temperature is the average of temperatures sensed at at least two points, those points being first on the outside surface of the mixer housing near the second end of the mixer and second on the pipe or tube of the inlet line to the heat exchanger means, and the master controller means controls the power intensity to the heater using a Triac TM power controller when the sensed average temperature is below the set-point, and the master controller means pulses the liquid nitrogen master open-and-close solenoid valve open and closed when the process temperature is above the set-point. In this embodiment, whenever the process temperature set-point is satisfied, the controller means turns off power to the heater and maintains the liquid nitrogen master open-and-close solenoid valve closed. This embodiment operates to control the temperature of a constant flow rate and constant pressure process gas stream feeding the heat exchanger means, thereby maintaining the heat exchanger means at a constant temperature.

In another embodiment, the master controller means has cascade control means involving a primary process temperature and a secondary process temperature, whereby the primary process temperature is sensed at at least one point on the heat exchanger means and the secondary process temperature is sensed at at least two points, those points being first on the outside surface of the mixer housing near the second end of the mixer and second on the pipe or tube of the inlet line to the heat exchanger means, and the master controller means controls the primary process temperature by controlling the secondary process temperature, and the master controller means controls the secondary process temperature by controlling the power intensity to the heater using a Triac TM power controls let when the sensed average temperature is below the set-point, and the master controller means cycles the liquid nitrogen master open-and-close solenoid valve open and closed when the process temperature is above the set-point. In this embodiment, whenever the primary process temperature set-point is satisfied, the controller means turns off power to the heater and maintains the liquid nitrogen master open-and-close solenoid valve closed.

In still another embodiment, the fail-safe controller means has at least one process temperature high-limit set-point and at least one process temperature low-limit set-point, whereby the process temperature is sensed at at least one point on the heat exchanger means, and the fail-safe controller means turns off the power to the heater when the process temperature equals or climbs above the high-limit set-point, and the fail-safe controller means closes the liquid nitrogen fail-safe open-and-close solenoid valve when the process temperature equals or falls below the low-limit set-point. In this embodiment, when either the high-limit set-point or the low-limit set-point is exceeded, an alarm sounds to notify the operator of the fail-safe condition.

There is also provided by the principles of this invention a process for mixing a cryogenic liquid stream with a constant pressure and constant flow rate gaseous stream, thereby forming a mixed stream; and inducing high turbulence in the mixed stream to maximize the contact and mixing of gas and unvaporized liquid. The process further comprises forcing the mixed stream through a tortuous path in contact with a heat sink mass to maximize the heat transfer between the mixed gas and the heat sink mass.

In a still further embodiment, the mixing of the constant pressure and constant flow rate gaseous stream with the liquid stream is by discharging the liquid stream from the second conduit into a downstream portion of the first conduit.

In one embodiment, the inducing high turbulence in the mixed stream is by discharging it into copper wool and reversing its flow direction by 180 degrees by directing the stream at a closed end of the mixer.

In one embodiment, the forcing of the mixed stream through a tortuous path to maximize the heat transfer between the mixed gas and the heat sink mass is by directing the stream to flow through a baffle having a plurality of small holes, then redirecting the stream to flow through another baffle which also has a plurality of small holes, which, however, are different in number, and non-aligned with the holes in the first baffle, and by continuing to redirect the stream through a repeating adjacent series of such first baffle/second baffle configuration to achieve a predetermined heat sink mass and heat transfer contact surface area. In a further embodiment, the baffles are disc shaped.

Accordingly, there is provided by the principles of this invention a mixer for mixing two fluid streams. The mixer comprises a sealed elongated housing having a first end and a second end. A first conduit extends through the first end of the housing and extends internally and centrally within the housing. The first conduit has an inlet external to the housing and an outlet within the housing. The outlet of the first conduit is near, and is directed perpendicular to, the second end of the housing. A second conduit extends through the portion of the first conduit which is external to the housing and extends internally and centrally within the first conduit. The second conduit has an inlet external to the first conduit and the housing and an outlet within the first conduit. The outlet of the second conduit is within, and nearer to, the first end of the housing than to the second end of the housing. The second conduit and the first conduit form an annulus in the space therebetween.

The mixer also comprises means for inducing high turbulence in a fluid stream discharged from the outlet of the first conduit, the means being located at, and surrounding, the outlet of the first conduit. In one embodiment such means is a bed of copper wool.

The mixer also comprises a plurality of disc shaped baffles located in a spaced-apart series arrangement along the outside surface of the first conduit. The baffles are located throughout the length of the portion of the first conduit within the housing. Each baffle has a thickness and extends outwardly from the outer surface of the first conduit to near the wall of the housing. Each baffle also has a plurality of holes which extend through the thickness of the baffle. The number of the holes in each baffle are different than the number of the holes in the baffles adjacent thereto in the series. The location of the holes in each baffle is non-aligned with the location of holes in the baffles adjacent thereto in the series. The mixer has an outlet located in the first end of the housing. In one embodiment the number of baffles is seven.

In one embodiment the mixer further comprises means for insulating the outside surface of the housing.

In another embodiment the first and second conduits, the housing, and the disc shaped baffles are copper, and the flanges are brass.

All embodiments of the mixers of this invention can be used in the processes and systems described herein.

BRIEF DESCRIPTION OF THE DRAWINGS

FIG. 1A is a simplified schematic flow and instrument diagram of the principal components of this invention using a Type-1 Master Controller.

FIG. 1B is a simplified schematic flow and instrument diagram of the principal components of this invention using a Type-2 Master Controller.

FIG. 2 is an illustration of a mixer for this invention.

FIG. 3 is a drawing of a subassembly of the mixer of FIG. 2.

FIG. 4 is a schematic flow and instrumentation diagram of one embodiment of this invention using a Type-2 Master Controller.

FIG. 11 is finally another graph of temperature control using this invention and shows temperature control during the WF/PC II thermal vacuum testing.

FIG. 12 is an enlarged portion of FIG. 11.

DESCRIPTION OF THE PREFERRED EMBODIMENT

Figure 5:
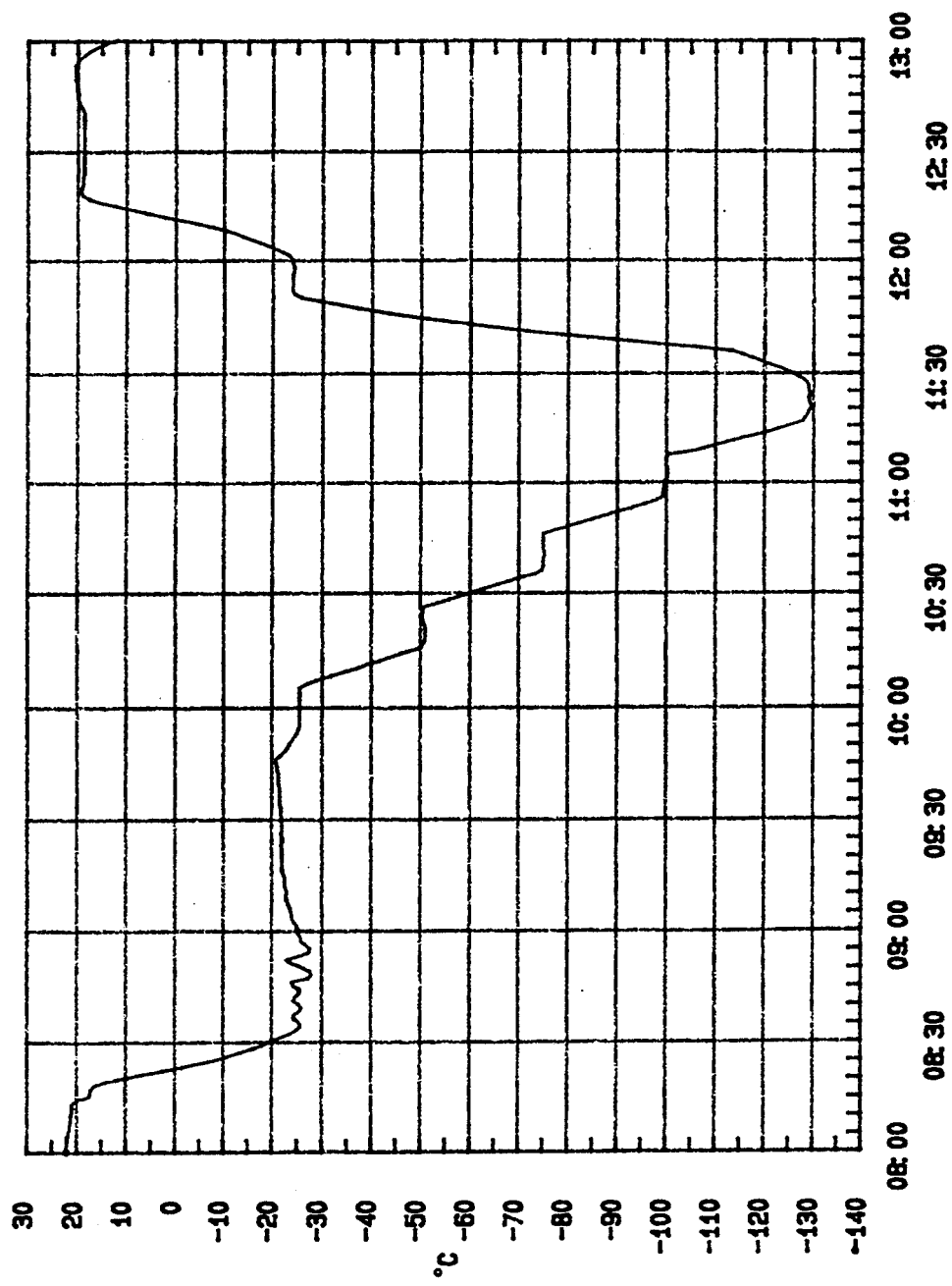
FIG. 5 is a graph of temperature control using this invention.

With reference to the drawings, like element number are employed to designate like components.

FIGS. 1A and 1B are schematic flow and instrumentation diagrams of two embodiments of this invention in which gaseous and liquid nitrogen enter the system at lines 20 and 22, respectively. The gaseous nitrogen flows in series from line 20 to solenoid valve 24, to manually adjustable valve 26, to flow indicator 28, to heater 30, and then to mixer 33. Liquid nitrogen flows in series through line 22 to fail-safe control solenoid valve 34, to master control solenoid valve 35, to manually adjustable valve 36 and then to mixer 33. The gaseous and liquid nitrogen streams are intimately mixed in mixer 33 to damp out temperature surges and to produce a precisely temperature-controlled gaseous nitrogen stream free of high amplitude temperature spikes. The thusly formed precise temperature-controlled gaseous nitrogen stream exits mixer 33 through line 38 and enters shroud or other heat exchanger 40. The pressure in the shroud or other heat exchanger 40 is regulated by manually adjusted valve 41 located in line 42 from shroud or other heat exchanger 40.

In one embodiment of this invention, the shroud or other heat exchanger 40 is to be temperature controlled to a predetermined temperature to meet specific testing requirements of a test article placed either near or on the shroud or other heat exchanger 40.

In the embodiment of FIG. 1B, temperature sensing element 43, mounted at a midpoint location on the shroud or other heat exchanger, transmits a signal 48 which is received at the primary channel of master controller 49, and is the primary process control temperature. Temperature sensing element 37, mounted on the mixer 30 housing, transmits a signal 45 to provide an indication of the temperature of the gaseous stream at the beginning of the tortuous flow path through the mixer. Temperature sensing element 39, mounted on the inlet line of the shroud or other heat exchanger 40, transmits signal 46 to provide an indication of the temperature of the tempered gaseous stream just prior to its entering the shroud or other heat exchanger. Signals 45 and 46 are wired together to form signal 47 which is in effect an average of the signals 45 and 46. Signal 47 is received at the secondary channel of master controller 49, and is the secondary process control temperature. Master controller 49 processes the primary and secondary channel input signals 48 and 47, and acts to control precisely the primary process control temperature to a predetermined primary channel set-point value by Controlling, the secondary process control temperature at the secondary channel temperature set-point value which varies as determined automatically by master controller 49. When the secondary process control temperature falls below the secondary channel set-point value, master controller 49 transmits signal 50 to Triac TM power controller 32 which provides controlled electric power through electric line 51, through power switch 31, through electric line 53, and to the heating element of heater 30. When the secondary process control temperature rises above the secondary channel set-point value, master controller 49 transmits signal 54 to energize, i.e. open, master control solenoid valve 35, allowing liquid nitrogen to flow to mixer 33 provided that fail-safe solenoid valve 34 is energized, i.e. open, and that manually adjusted throttle valve 36 is at least partially open.

In the embodiment of this invention illustrated in FIG. 1A, master controller 49 receives only signal 47 as its process control temperature value. When the process control temperature falls below the master controller 49 set-point value, controller 49 transmits signal 50 to Triac TM power controller 32 which provides controlled electric power through electric line 51, through power switch 31, through electric line 53, and to the heating element of heater 30. When the process control temperature rises above the controller 49 set-point value, master controller 49 transmits signal 54 to energize, i.e. open, master control solenoid valve 35, allowing liquid nitrogen to flow to mixer 33 provided that fail-safe solenoid valve 34 is energized open and that manually adjusted throttle valve 36 is at least partially open. In this embodiment, the master controller 49 set-point value is manually selected in such a manner as to cause the shroud or other heat exchanger 40 temperature to be precisely maintained at a predetermined desired temperature since the process control temperature of the gaseous nitrogen stream entering the shroud or other heat exchanger is temperature controlled and of constant flow rate and pressure.

With references to both FIGS. 1A and 1B, to protect the shroud or other heat exchanger 40 from overheating or overcooling fail-safe controller 58 is employed. Temperature sensing element 44, which is mounted at a selected mid-point location on the shroud or other heat exchanger 40, transmits fail-safe control temperature signal 56 to fail-safe controller 58. If the fail-safe control temperature falls below the low-limit set-point of fail-safe controller 58, fail-safe control solenoid valve 34 is de-energized, i.e. closed, to prevent further flow of liquid nitrogen to the mixer until the fail-safe control temperature warms to a safe value. if the fail-safe control temperature rises above the high-limit set-point of controller 58, power switch 31 is opened to prevent further electrical power from flowing to the heater element of heater 30 until the fail-safe control temperature cools to a safe value.

The mixer of this invention provides a high-conductivity thermal mass which acts as a thermal shock absorber on the mixed stream. The mixer must provide sufficient in-line thermal mass to effect the desired thermal shock absorbing capability while at the same time not providing a mass which renders the system's temperature control feedback response sluggish. The configuration of the mixer must provide a high heat transfer rate to/from the nitrogen stream, while at the same time minimizing the pressure drop in the mixer. To be useful for one-of-a-kind tests, the design must be simple and the fabrication costs must be low.

To achieve the degree of mixing of the gaseous and liquid nitrogen streams operable for preventing high amplitude temperature spikes, while at the same time enabling fast responses to temperature set-point changes, special mixer 33 was designed and is illustrated in FIGS. 2 and 3. In the embodiment shown in FIGS. 2 and 3, mixer 33 has an 0.75 inch diameter copper tube 60 located in the center thereof. Concentrically inside the uppermost portion of tulle 60 is located an 0.5 inch diameter copper tube 62 of which extends part way down the inside of tube 60. Gaseous nitrogen enters tube 60 at inlet 66 and flows into annulus 64 formed by tubes 60 and 62. Heat is transferred indirectly from the gaseous nitrogen stream through the walls of tube 62 to the liquid nitrogen stream. Liquid nitrogen enters tube 62 at inlet 68 and exits at outlet 70 into tube 60. Between outlet 70 and outlet 72 of tube 60, the liquid nitrogen is mixed with the gaseous nitrogen. The mixture from outlet 72 then enters into inner chamber 74 of mixer 33. Attached to the outside diameter of tube 60 are seven 0.25 inch thick copper discs having configurations 76 and 78. Disc configurations 76 have twelve evenly spaced 0.375 inch holes 80 drilled closer to the outer diameter of the disc, while second disc configuration 78 has eight evenly spaced holes 82 drilled closer to the inside diameter or axis of the disc. Copper discs 76 and 78 are silver soldered to tube 60 at a spacing of 2.25 inch with the two disc configurations mounted alternately.

Before mounting either outlets 66 or 68 or discs 76 and 78 to tube 60, tube 60 is mounted in cover 84 thorough a centrally located hole therein and silver soldered thereto. Cover 84 is constructed from a 150 lb. brass blind flange. Cover 84 also has an off-center hole through which is mounted, and attached by silver soldering, an 0.75 inch diameter copper exit tube 86. Tube 86 contains outlets 88 and 90. Outlet 88 is connected to line 38 which leads to shroud or other heat exchanger 40. Outlet 90 is connected to a pressure relief safety valve 131. Tubes 60, 62, 86, discs 76 and 78, and cover 84, collectively form mixer subassembly 92, as shown in FIG. 3.

Mixer 33 further comprises outer shell 94 consisting of 3-inch Type K, copper pipe 96, slip-joint pipe cap 98 silver soldered to one end of pipe 96, and 150 lb. brass flange 100 silver soldered to the other end of pipe 96. The overall length of mixer 33 from cover 84 to end cap 98 is about 27 inches. The inside diameter of shell 94 is just slightly larger than the outside diameter of discs 76 and 78 thereby allowing mixer subassembly 93 to be inserted into shell 94 while preventing a deleterious amount of short circuiting of nitrogen around the outside diameter of discs 76 and 78. The space from the bottom of shell 94 up to the lowest disc 76 is filled with a bed of copper wool 102. Cover 84 is bolted and sealed to flange 100 with a durable gasket and bolts (not shown in the FIG. 2) which are conventional in design thereby forming sealed mixer unit 104 with inlets 66 and 68, and outlets 88 and 90. Thermocouple 37, installed on the outside surface of shell 94 near the bottom thereof, provides means for monitoring the mix-point temperature. Thermocouple 107, installed on the outside surface of shell 94 near the top thereof, provides means for monitoring the tempered gas temperature. Sealed mixer unit 104 is insulated with about 3 inches of urethane foam-in-place foam 109 which is encased within 10-inch diameter sonotube 110. The bottom of sonotube 110 contains small thermal disc-shaped support 112 made of wood or any other thermal insulating material which supports mixer 33 while the urethane foam is formed. The thermal mass of the mixer 33, without insulating elements 108, 110, and 112 is about 15 lbs. Copper wool 102, and discs 76 and 78 with staggered holes 80 and 82 which cause the nitrogen to flow in an upwardly sinuous path through mixer unit 104, are operable for preventing temperature surges from occurring in the gaseous nitrogen stream discharged from mixer outlet 88.

It should be understood, however, that the size and mass of mixer 33 depends on the mass of the shroud or other heat exchanger 40.

A further embodiment is shown in FIG. 4 which shows the flow schematic and instrumentation diagram for one embodiment of this invention in which a constant pressure and flow rate gaseous nitrogen stream is fed from gaseous nitrogen manifold 120 into the control circuit line 20, and then in series to open-and-close solenoid valve 24 with power switch 121, to small throttle valve 26 for providing manual flow control adjustment of the gaseous nitrogen flow rate, to flow indicator 28, to the heater 30, to check valve 125 and then to the mixer 33. Valve 24 is opened when the master controller 49 is powered. Check valve 125 is placed in the line between heater 30 and valves 124 and 129 to prevent back-flow into gaseous nitrogen manifold 120. A temperature indicator 126 is also placed in this line to indicate the temperature of the gaseous nitrogen at the heater outlet. If the heater overheats above the temperature switch 122 trip point, the temperature switch 122 opens to prevent electrical power from flowing to the heater in interlock circuit 155. Heater 30 is controlled by power controller 132 with Triac TM power unit with zero crossover firing power controller 32 is connected to power switch 31, which is connected to the heating element of heater 30 in electrical interlock circuit 153 through electric lines 51 and 53.

Mixer by-pass line 128 allows heated gaseous nitrogen to flow directly to shroud or other heat exchanger 40 for bake-out tests when cooling is not needed. Line 128 contains manual shut-off valve 129 which is closed during normal test operations.

power to heater 30 is automatically shut off by the fail-safe controller at electric line 52 if shroud or other heat exchanger 40 overheats beyond a predetermined high-limit temperature set-point of fail-safe temperature controller 58. Power intensity to heater 30 is modulated through power controller 31 by master controller 49 control signal 50 whenever the averaged temperature from thermocouple 37 and thermocouple 39 is below the predetermined process control temperature set-point of master controller 49.

Liquid nitrogen from manifold 123 is fed into line 22 and then in series to fail-safe open-and-close solenoid valve 34, to master control open-and-close solenoid valve 35 which is operated by a solid state relay on electric line 54, and to hand-controlled throttle valve 36. Fail-safe open-and-close solenoid valve 34 is automatically de-energized, i.e. closed, through electric line 59 if shroud or other heat exchanger 40 overcools below the predetermined low-limit temperature set-point of fail-safe controller 58. Master control solenoid valve 35 cycles open and closed as master controller 49 calls for cooling. Throttle valve 36 is manually adjusted to throttle the amount of liquid nitrogen delivered per each open-and-close cycle/pulse of valve 35. The pressure in the circuit is manually adjusted with back-pressure hand control valve 41 located downstream of shroud or other heat exchanger 40 and just upstream of main vent manifold 136. Master control solenoid valve 35 may require the application of heat to keep it from freezing in the open position. Hand-controlled throttle valve 36 should be a needle valve of sufficiently high quality to provide fine throttle adjustments during testing pressure indicator 133 is installed in line 42 to facilitate adjustment and monitoring of pressure in lines 38 and 42.

During cooling periods, gaseous nitrogen is fed down tube 60 of mixer 33 at constant pressure and flow rate. When master controller 49 calls for cooling, liquid nitrogen is pulsed into mixer 33 through tube 62. The pulsed slug of liquid nitrogen mixes with the continuous gaseous nitrogen stream in the lower portion of tube 60 and the mixture then impinges on bed of copper wool 102. Copper wool 102 induces turbulence in the mixed stream, and disperses the liquid nitrogen and impedes its flow relative to the gaseous nitrogen, thereby speeding the vaporization of the liquid nitrogen. The nitrogen flow is then forced to change directions 180 degrees, and is redirected upwards through holes 80 and 82 in discs 76 and 78, respectively, in a sinuous and tortuous flow path which prevents channeling and enhances heat transfer to disc 76 and 78 and shell 94 which also speeds the vaporization of the liquid nitrogen. The tempered gaseous nitrogen then leaves mixer 33 through exit port 88 and continues on to shroud or other heat exchanger 40.

Master controller 49 can be equipped with indicator lights 150 and 152 to indicate cooling as well as the introduction of liquid nitrogen into the system, and to indicate electrical power to heater 30, respectively power controller 32 can be equipped with indicator light 154 also to indicate power being supplied to heater 30.

Fail-safe controller 58 can be equipped with indicator lights 156, 158 and 160 to indicate an overcooled state, an overheated state, and a safe state, respectively.

port 90 of tube 86 from mixer 33 is connected to pressure safety valve 131. Pressure safety valve 132 can be connected to line 22 between solenoid valves 34 and 35 for safety. Both valves 131 and 132 can be connected to small vent manifold 134 which ultimately is vented to main vent manifold 136.

Use of this method requires close attention to the establishment of optimum throttle valve 36 and master controller 49 settings during testing. During test periods, the gaseous nitrogen flow rate and pressure must remain stable. Additionally, it has been found that control is improved if the feed line pressure of the liquid nitrogen is no greater than about 10 psi above the gaseous nitrogen line pressure.

Two sets of prototype tests were conducted using a prototype control system assembly of this invention, to study the response of the control system of this invention. The temperature control variable for the first set of tests was a 30 lb. copper plate heat exchanger. For the second set of tests, the temperature control variable was a small 3 to 4 lb. stainless steel heat exchanger used for cooling a thermoelectric quartz crystal micro balance, hereinafter referred to as "TQCM."

Two types of master temperature controllers were used to test the circuit shown in FIG. 4 and are hereinafter referred to as "Type-1" and "Type-2." Both controller types were used in each set of tests to provide a functional comparison between the two. The purpose was to ascertain if controller type was an important factor in the performance of the system.

For these prototype test sets, the signals from thermocouples 39 and 134 were connected together to represent an average temperature across the heat exchanger and the resultant signal was used to provide the process control temperature input to the Type-1 master controller. For the Type-2 master controller, the signal from thermocouple 43 provided the process control temperature input to the primary channel and the signal resulting from connecting together the signals from thermocouples 39 and 134 provided the process control temperature input to the secondary channel. FIGS. 5 to 10 illustrate results from these tests.

For the first prototype test, the spaces between the copper discs 76 and 78 in mixer were filled with about 10 lbs of small steel balls or BBs (not shown in the FIGS.) to provide additional thermal mass. Type-2 master controller was used in the first test. Very sluggish feedback response from this first test configuration revealed that there was too much thermal mass in the mixer. The BBs were removed from the mixer and a second test was conducted. A more rapid feedback response was obtained, however, temperature control was quite sensitive to the settings of throttle valves 26 and 36. Several trials were required to establish optimum settings of throttle valves 26 and 36 and of the proportional, integral, and differential control values for master controller 49. FIGS. 5 to 10 illustrate results from the prototype tests using optimum settings for throttle valves 26 and 36 and for Type-1 or Type-2 master controllers. In FIGS. 5 to 12 the time of day is shown on the abscissas and the measured temperature in ° C. is shown on the ordinates.

FIG. 5 illustrates test results obtained using a Type-1 controller to provide temperature control of a 30 lb copper plate heat exchanger. The test began with the copper plate at ambient temperature, then the plate is cooled in steps to set-points at −25°, −50°, −75°, −100° and −160° C. After holding at −160° C., the plate was reheated to set-points at −25° and +20° C. At each step the temperature was held at the set-point for only 10 minutes so that several set-point levels could be demonstrated within a short period of time. FIG. 5 illustrates that no overshooting occurred at the set-point temperatures.

Figure 6:
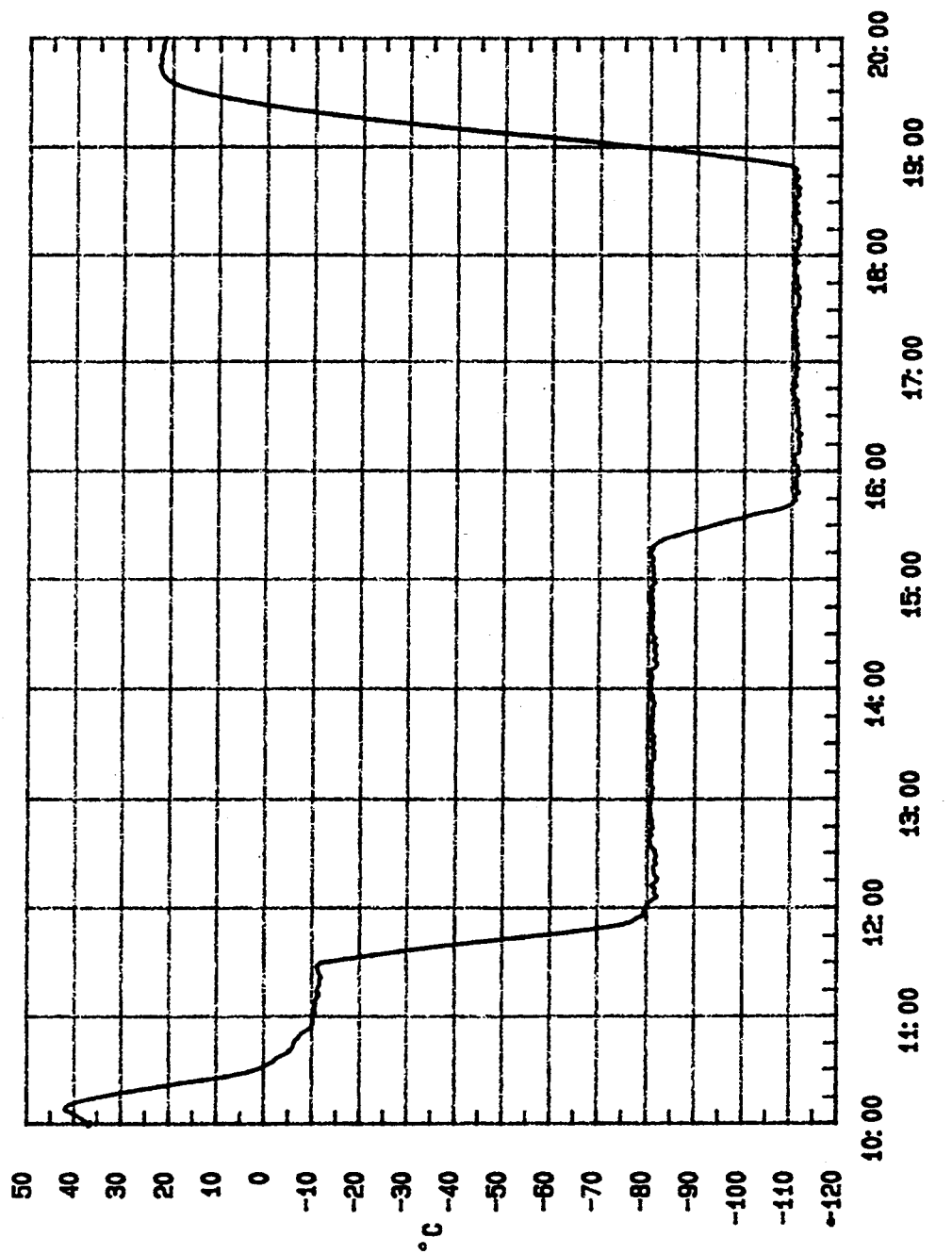
FIG. 6 is another graph of temperature control using this invention.

FIG. 6 shows test results using a Type-1 controller to provide temperature control of the TQCM heat exchanger. The test demonstrated the ability of the control system to hold precise set-point temperatures, i.e. −80° and −110° C., for long durations.

Figure 7:
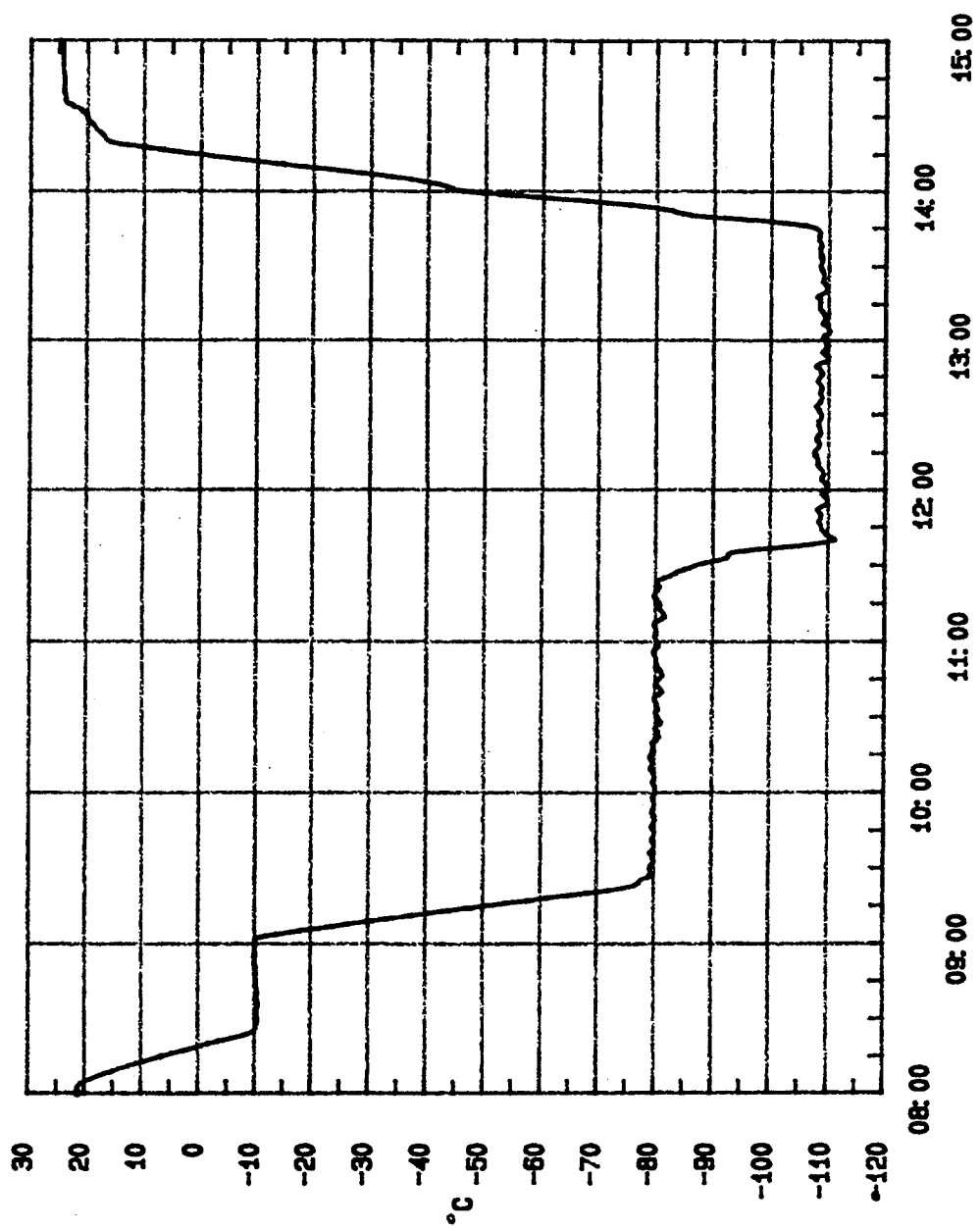
FIG. 7 is yet another graph of temperature control using this invention.
Figure 8:
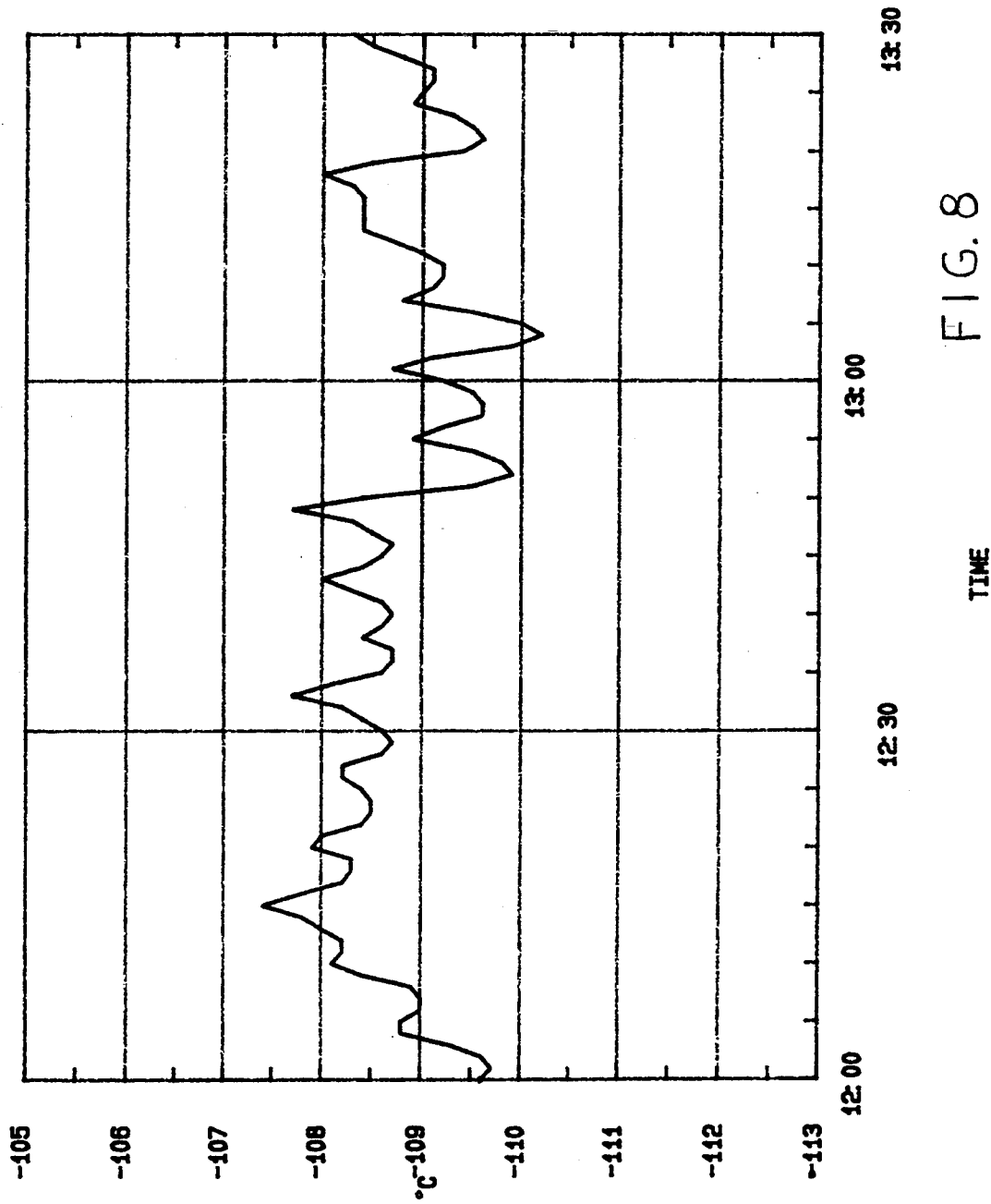
FIG. 8 is an enlarged portion of FIG. 7.

FIG. 7 illustrates test results using a Type-2 controller to provide temperature control of the TQCM heat exchanger. This test, a comparison test at the same conditions as the test shown in FIG. 6, produced, as can be seen in FIG. 7, similar favorable temperature control precision results as those shown in FIG. 6. FIG. 8 shows an enlarged detail of FIG. 7 in the −110° C. region and demonstrates that the temperature control precision was about ±2° C.

Figure 9:
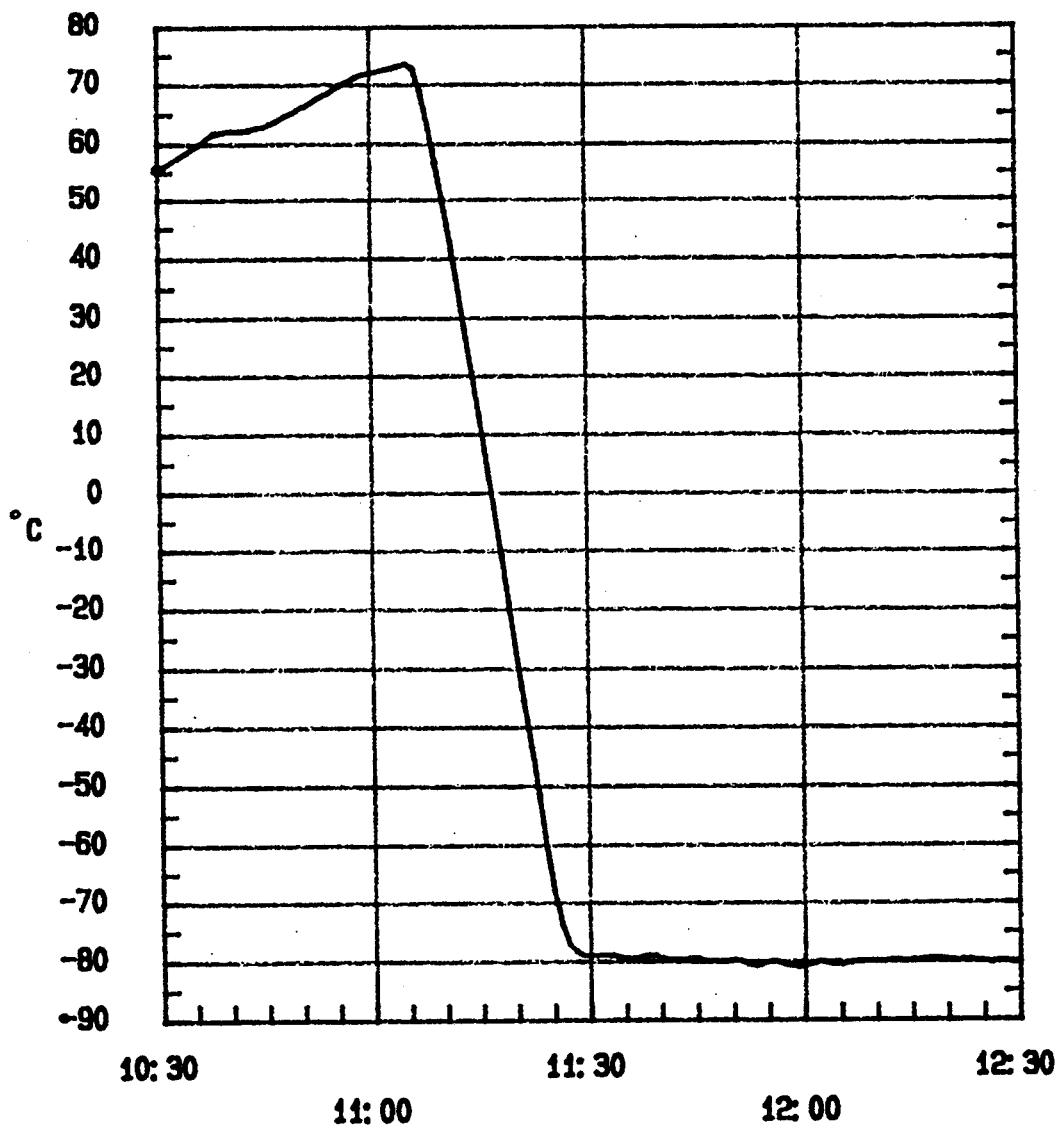
FIG. 9 is still another graph of temperature control using this invention.
Figure 10:
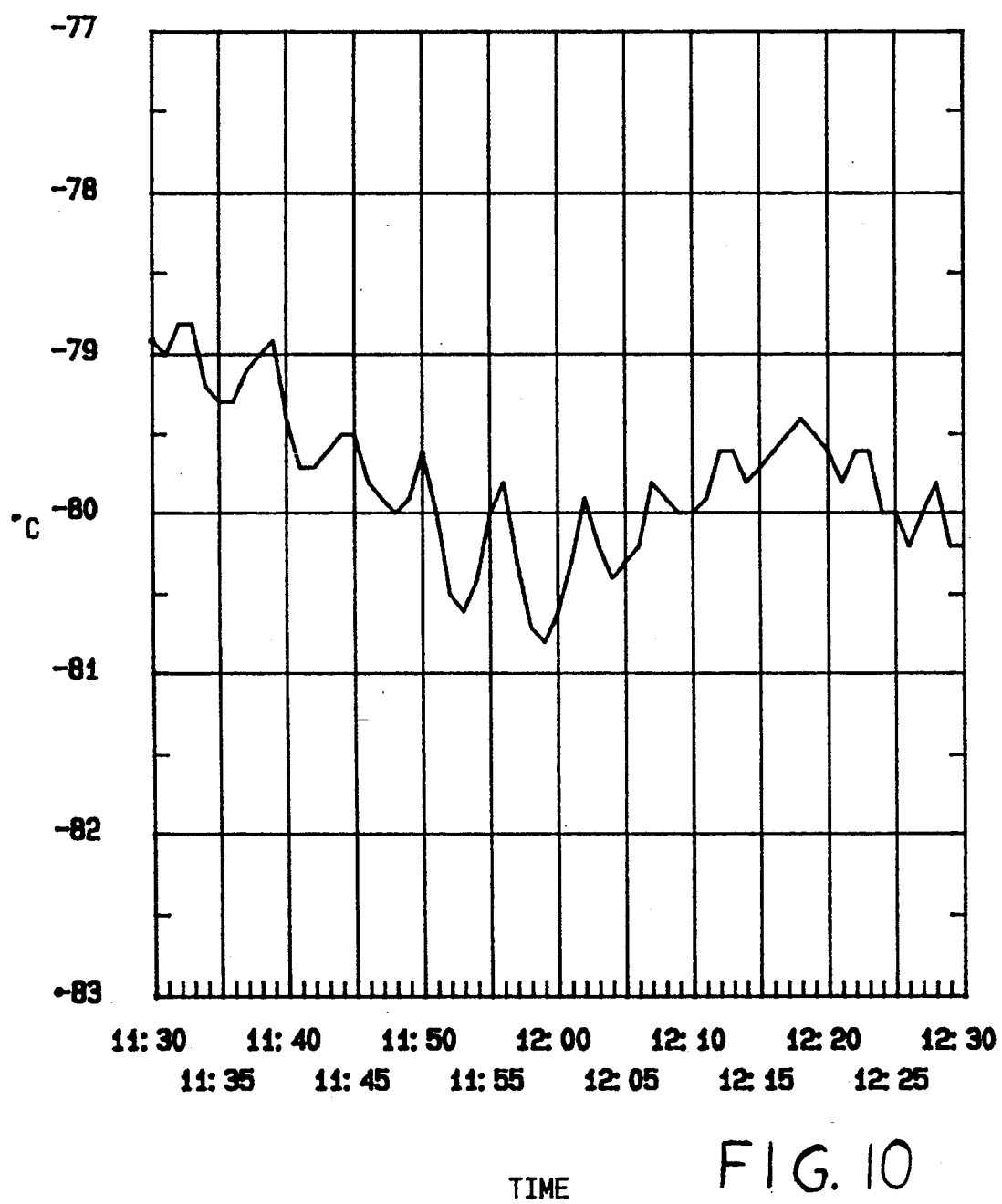
FIG. 10 is an enlarged portion of FIG. 9.

FIG. 9 illustrates 32 test results obtained using a Type-2 controller to provide temperature control of the TQCM heat exchanger during a rapid transition from +75° to −80° C. which occurred within about 20 minutes. Even though the temperature of the TQCM heat exchanger was changed at a rate over 7° C. per minute, there was no significant overshoot of the set-point temperature as demonstrated by FIG. 10 which shows the control precision at the set-point of −80° C. was about ±1° C.

Test results indicate that either Type-1 or Type-2 controllers can be used and excellent results obtained. There is, however, a somewhat higher precision obtainable with cascade type controller. Inexpensive controllers can also be used if desired.

Based on favorable results from the prototype tests, ten separate temperature control circuits containing mixers of this invention and configured in accordance with the flow and instrumentation schematic FIG. 4 of this invention were installed in the 10-ft Space Simulator facility at JPL for WF/PC II thermal vacuum testing. Type-1 master controllers were used for this installation since they were already owned and since the prototype tests had demonstrated that both master controller types were capable of producing the precise temperature control required, i.e. about ±2° C. or better.

A subsequent set of preliminary tests were performed using these ten temperature control circuits and, while conducting these tests, it was determined that the best temperature control of the WF/PC II test shrouds could be obtained when the process control temperature input to the master controller was provided by the signal resulting from connecting together the signals from thermocouples 37 and 39. All ten control circuits were thusly configured, i.e. the same configuration as presented in FIG. 4 of this invention, and the final WF/PC II thermal vacuum testing was conducted using this configuration. FIG. 11 presents temperature control results obtained from using one of the ten temperature control circuit to control the temperature of one WF/PC II shroud during the actual WF/PC II stimulus and facility readiness verification thermal vacuum test. For this test, the set-points for the shroud temperatures for this circuit were set at +35° C. for the first test phase, at −15° C. for the second test phase, at −30° C. for the third test phase, at −150° C. then at −160° C. for the fourth test phase, at −15° C. for the fifth test phase and finally at +20° C. to return the shroud to ambient temperature to end the test. FIG. 12 illustrates the temperature control precision during the fourth test phase for the circuit shown in FIG. 11.

Although the systems, processes and mixers of this invention have been described for the mixing of gaseous nitrogen and liquid nitrogen, it is to be understood that this invention can be used for mixing any gas and any cryogenic liquid to achieve a controlled temperature environment.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures, and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A single-pass flow-through system for producing accurate and precise temperature control in the −160° to +90° C. temperature range comprising:

(a) a first source for providing gaseous nitrogen at ambient temperature and constant pressure;

(b) a first line for receiving gaseous nitrogen from the first source comprising an open-and-close solenoid valve, a first hand-controlled throttle valve for manually adjusting the flow of gaseous nitrogen in the first line to a predetermined constant flow rate, and an in-line electric heater for heating the gaseous nitrogen;

(c) a second source for providing liquid nitrogen at constant pressure;

(d) a second line for receiving liquid nitrogen from the second source comprising a fail-safe control open-and-close solenoid valve, a master control open-and-close solenoid valve, and a second hand-controlled throttle valve for manually limiting the flow of liquid nitrogen in the second line to a predetermined maximum flow rate;

(e) a mixer for receiving gaseous nitrogen from the first line and liquid nitrogen from the second line, and for mixing the gaseous nitrogen and liquid nitrogen and forming a tempered gaseous nitrogen stream;

(f) a third line for receiving the tempered gaseous nitrogen from the mixer;

(g) a heat exchanger means for receiving the tempered gaseous nitrogen stream from the third line;

(h) a fourth line for receiving gas from the heat exchanger means comprising an adjustable back-pressure control valve for adjusting the gas stream pressure in the fourth line, and a vent for venting the gas from the adjustable back-pressure control valve and from the system;

(i) fail-safe controller means for sensing the temperature of a predetermined fail-safe point in the system which is no further upstream than the heat exchanger means, and for using the sensed temperature of the predetermined fail-safe point for turning off the power to the heater when the temperature of the predetermined fail-safe point exceeds a predetermined high-limit set-point temperature, and for closing the fail-safe control open-and-close solenoid valve when the temperature of the predetermined fail-safe point falls below a predetermined low-limit set-point temperature; and (j) master controller means for sensing the temperature of two predetermined master points in the system, for generating an average temperature signal from the two sensed temperatures, and for using the average temperature signal for controlling the master control open-and-close solenoid valve, and for controlling the power intensity to the heater, in such a manner that the system is operable for producing accurate and precise temperature control of the tempered gas received by the heat exchanger means in the about $-160°$ to about $+90°$ C. temperature range.

2. The system of claim 1, wherein the first line further comprises a flow metering element.

3. The system of claim 1, wherein the predetermined master points are no further upstream than the mixer.

4. The system of claim 1, wherein a first one of the predetermined master points is no further downstream than the heat exchanger means and a second one of the predetermined master points is no further downstream than the third line.

5. The system of claim 1, wherein the mixer has an elongated housing having a first end and a second end, and the first, second and third lines are in fluid communication with the first end, and the second end is a blind end, and wherein a first one of the predetermined master points is on the mixer housing near the second end, and wherein the heat exchanger means has an inlet connected to the third line, and wherein a second one of the predetermined master points is on the inlet of the heat exchanger means.

6. The system of claim 5, wherein the master controller means has a temperature set-point, and wherein the master controller means causes power to be delivered to the electric heater when the temperature set-point is higher than the temperature corresponding to the average temperature signal.

7. The system of claim 5, wherein the master controller means has a temperature set-point, and wherein the master controller means causes power to be turned off to the electric heater when the temperature set-point is lower than the temperature corresponding to the average temperature signal.

8. The system of claim 5, wherein the master controller means is cascade control means having a primary control temperature and a secondary control temperature, and wherein the master controller means also senses the temperature of a third predetermined master point in the system, wherein the third predetermined master point is on the heat exchanger means and is the primary control temperature, wherein the average temperature signal derived from the first and second master points is the secondary control temperature.

9. The system of claim 1, wherein the predetermined fail-safe point is on the heat exchanger means.

10. The system of claim 1, wherein the fail-safe open-and-close solenoid valve is open when energized, and wherein the fail-safe controller means closes the fail-safe open-and-close solenoid valve by deenergizing the power to the fail-safe open-and-close solenoid valve.

11. The system of claim 1, further comprising means for preventing the pressure of the liquid nitrogen received by the second line from exceeding the pressure of the gaseous nitrogen received by the first line by more than about 10 psi.

12. The system of claim 1, wherein the adjustable back-pressure control valve is a manually adjustable back-pressure control valve.

13. The system of claim 1, wherein the adjustable back-pressure control valve is an automatically adjustable back-pressure control valve.

14. The system of claim 1, wherein the mixer comprises (a) means for mixing the gaseous nitrogen received from the first line, thereby forming a mixed stream;

(b) means for inducing high turbulence in the mixed stream and maximizing the contact and mixing of gaseous nitrogen and unvaporized liquid nitrogen; and (d) means for directing the mixed stream through a tortuous path in contact with a heat sink mass contained within the mixer for enhancing the heat transfer between the mixed stream and the heat sink mass and for causing the tempered gaseous nitrogen stream formed in the mixer to be free of high amplitude temperature spikes.

15. The system of claim 14, wherein the heat sink mass is operable for enabling a gaseous nitrogen temperature transition rate of from about 4° to about 10° C. per minute between set-point temperature changes in the master controller means.

* * * * *